United States Patent

[11] 3,633,074

[72] Inventor Takasi Nojiri
 135 Aza-Koyasu, Oaza-Haguro, Inuyama-shi, Aichi-ken, Japan
[21] Appl. No. 887,510
[22] Filed Dec. 23, 1969
[45] Patented Jan. 4, 1972
[32] Priorities Dec. 25, 1968
[33] Japan
[31] 43/113240;
 May 8, 1969, Japan, No. 44/42142

[54] ELECTRONIC DEVICE WITH USE OF BLOCK UNITS
 4 Claims, 16 Drawing Figs.
[52] U.S. Cl............................................. 317/101 CC, 35/19
[51] Int. Cl........................................... H05k 1/04
[50] Field of Search........................................ 317/101 CC, 101 CM; 35/19 A

[56] References Cited
UNITED STATES PATENTS
3,386,010 5/1968 Nojiri ..................317/101 CC UX
3,514,872 6/1970 Bradley ...................... 35/19 A UX
FOREIGN PATENTS
43,977 11/1965 Germany...................... 35/19 A UX
916,838 1/1963 Great Britain................ 35/19 A UX Primary Examiner—David Smith, Jr.
Attorney—Linton & Linton ABSTRACT: An electronic device comprising block units individually encasing a circuit element, connection leads for electrically connecting said block units and electronic boards provided with mounting holes to mount said block units and connection leads which holes are bored at the central part of each side of a square drawn on said electronic board.

INVENTOR
TAKASI NOJIRI

BY Linton and Linton
ATTORNEYS

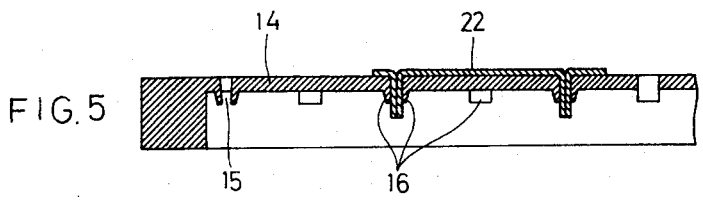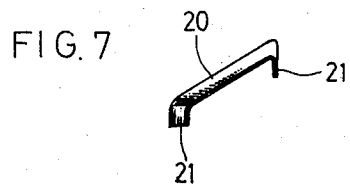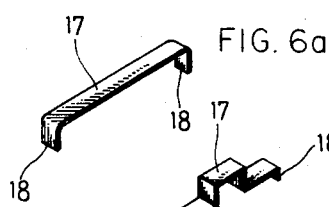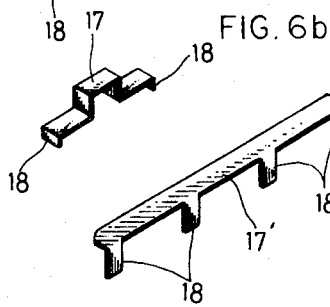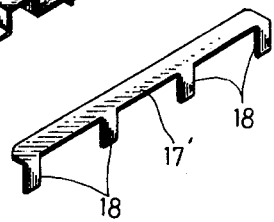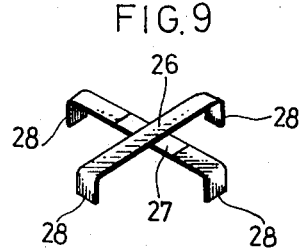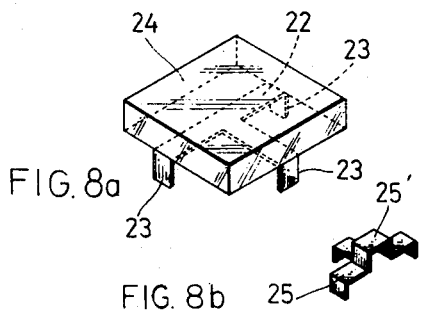

ELECTRONIC DEVICE WITH USE OF BLOCK UNITS

The present invention relates generally to electronic devices and more particularly to various electronic devices which can be set up by simply inserting block units with plural leg portions in an electronic board with many mounting holes and by removing them.

It is known generally to set up various electronic devices by two-dimensionally arranging block units including circuit elements such as resistors and transistors on an electronic board but even then the electrical connections among the circuit elements are carried out still three-dimensionally as are done in ordinary electronic devices. These three-dimensional connections have not good correspondence with the two-dimensional wiring diagrams and are not suitable for children and amateurs who have not sufficient knowledge of electronic circuits to construct various types of electronic devices with ease. Also, when some of the block units are exchanged, the associated connections must be disconnected once and new ones are then necessary in the conventional art.

In the U.S. Pat. 3,386,010, connection units which are encased in cubic block units as other circuits elements, are adopted in order to simplify electrical connectors among block units and electronic devices of various types can be set up only by the rearrangement of block units in a frame means. As each of these block units has resilient contact pieces at the outer surfaces of sidewalls and a number of their block units are arranged compressibly in the frame means, they can be fastened as a whole but not individually. Consequently, in order to make satisfactory the electrical contact between any pair of adjacent neighboring contact pieces they have to be manufactured with special care so that said electrical contact may be maintained even if the individual block unit moves to some extent. Further, if the setup electronic device is vibrated, there will be the danger of incomplete electrical contact.

An object of the present invention is to provide an electronic device in which various electronic circuits can be built by inserting bock units including individually a circuit element and connection leads formed separately from block units into mounting holes bored through an electronic board.

Another object of the present invention is to provide an electronic device in which another electronic board is connected to an electronic board additively and block units and connection leads are inserted into mounting holes of the new board so as to join both boards, thereby making it possible to construct a more complicated electronic circuit.

Further object of the present invention will become clear in the following description taken in conjunction with appended drawings, in which:

FIG. 5 is a cross-sectional view taken on the line B—B of FIG. 1 showing the state of inserted connection leads;

FIGS. 6a, 6b, 6c, 7, 8a, 8b and 9 are perspective views of various forms of the connection leads;

FIG. 10 is a perspective view of a block unit;

FIG. 10b is a cross-sectional front elevation of the block unit shown in FIG. 10a;

FIGS. 11a and 11b are cross-sectional side elevation of the leg portions of the block unit and the connection lead.

Figure 2:
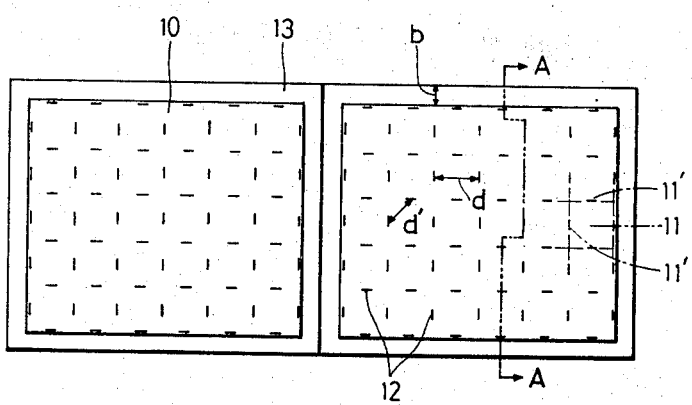
FIG. 2 is a plan view showing two electronic boards adjoining each other.
Figure 3:
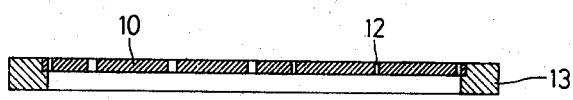
FIG. 3 is a cross-sectional view taken on the line A—A in FIG. 2.
Figure 4:
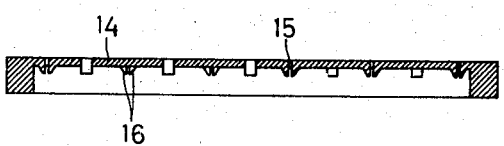
FIG. 4 is a view similar to FIG. 3 showing another embodiment of the electronic board.

Referring to FIGS. 2 and 3, an electronic board 10 of electrically insulating material or insulatingly coated metal is shaped in a flat plate. At the central portion of each side 11 of imaginary squares 11 drawn on the electronic board 10, a thin rectangular mounting hole 12 is bored. The electronic board 10 is made so as to be framed in a frame 13 and the width $b$ of the frame of the peripheral region of the board between the edge of the board and the outermost mounting holes is made equal to a half of the side length of the square 11. The frame may be formed integrally with the board. Next, referring to FIG. 4, an electronic board 14 is formed in the same manner as the electronic board 10 but at one side of a mounting hole 15 of the former board, a pair of tongue pieces 16 are provided integrally which are made in such a manner that the gap between the tips of the tongue pieces is smaller than that between the bases of the tongue pieces and that the tips can open resiliently. The electronic boards 10 and 14 are preferably moulded of synthetic resin. A connection lead 17 as shown in FIG. 6a and 6c is made of electrically conductive metal, at both ends of which electrically conductive leg portions of a thin plane form are provided integrally and at right angles. The distance between a pair of leg portions 18 belonging to a common connection lead 17 is set equal to the distance $d$ between corresponding mounting holes or to the integral multiple of $d$. The thickness of the leg portion 18 is adjusted so that a few of the leg portions may be held tightly in the mounting holes 12 or between a pair of tongue pieces 16 when they are inserted therein. The leg portion 18, which is of a simple plane form, is suitable for insertion in the hole 15 of the electronic board 14 but in order to be inserted in the mounting hole 12 of the electronic board 10, a leg portion 19 as shown in FIG. 11 which has a bend formed by means of a press and whose effective thickness is variable due to its elastic deformation. An electrically conductive connection lead 20 is adapted to be inserted in mounting holes of the adjacent two sides of the square and the distance between leg portions 21 of said connection lead is set equal to the oblique distance $d'$. An electrically conductive connection lead 22 is made in the form of a T and at its three end portions there are rectangularly provided conductive leg portions insertable in mounting holes bored at three sides of the square 11. On the upper surface of said connection lead 22, an insulating transparent knob plate 24 is attached for the easy insertion and removal of said connection lead. A conductive connection lead 25 as shown in FIG. 8b can be used in the same manner as the connection lead 22 but at its central portion a projection 25' is provided to make it easy for the insertion and removement of the connection lead. A cross-shaped connection lead 26 consists of two conductive strips crossing at right angles which are electrically insulated from each other by a vinyl piece 27. Leg portions 28 insertable in the mounting holes at four side of the square 11 are provided normal to at the four ends of the connection lead 26. Referring to FIG. 10, a block unit 29 includes a insulating base 30, a transistor 31 as a circuit element mounted on the base 30, a case 32 forming a cubic box together with the base 30 and four leg portions attached vertically at four sides of the base 30. The leg portion 33 are arranged in the same manner as those shown in FIG. 9. The connection of these leg portions 33, which are connected to the collector and the emitter of the transistor 31 and so on, is indicated by a schematic wiring diagram 34 drawn on the upper surface of the case. The block unit is so constructed as to encase one of the various circuit elements such as a resistor, capacitor or a choke coil and a schematic wiring diagram showing the connection between the circuit element and the leg portions is drawn on the upper surface of the case.

Figure 1:
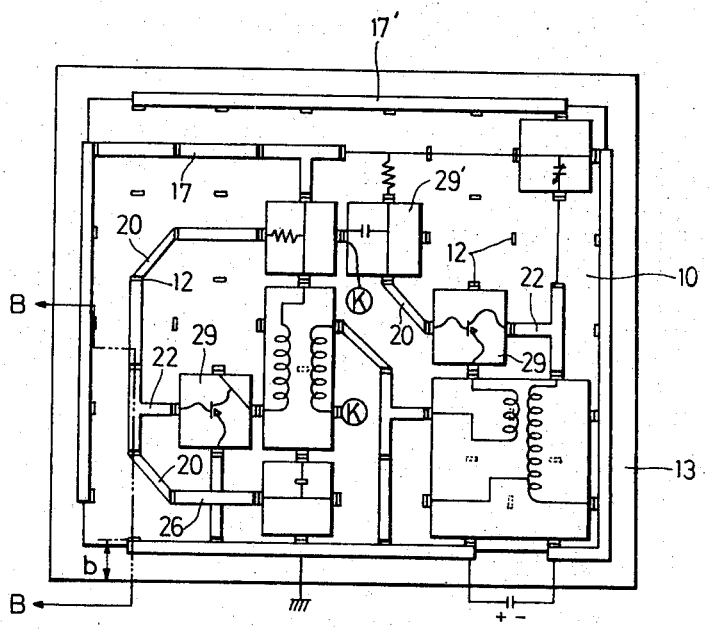
FIG. 1 is a plan view of one of those electronic devices according to the present invention which has been set up as an oscillating circuit of a wireless morse code practice device, one of various electronic devices that can be provided.

When an electronic device is set up according to the present invention, block units like that indicated by 29 are mounted on the electronic board 10 or 14 in accordance with the wiring diagram of said circuit. Connections among block units are effectuated by inserting connection leads such as that indicated by 20 into mounting holes 12. The set up electronic device is best seen in FIG. 1. Namely, in a mounting hole leg portions of different block units or of a few connection leads are tightly inserted to be fastened, thereby making sure of the electrical contact among block units. Connection leads are arranged two-dimensionally in effect.

As seen from the foregoings, according to the present invention each block unit and connection lead are fastened directly without using holders offensive to the sight and so they can be put in place as if the wiring diagram were traced thereby making it possible to complete an electronic device with schematic wirings. Moreover, as the mounting hole 12 or 15 is situated regularly at the central part of each side of said square, the connection between the connection lead and the block unit resembles closely the ordinary wiring diagram and therefore even those persons who have no preliminary knowledge can set up an electronic circuit or carry out the partial rearrangement or renewal of the circuit already set up without error and with ease according to the wiring diagram. Further, the exchange of block units or connection leads and their rotation by an angle equal to integral multiple of 90° can be carried out at will. Considering the arrangement of mounting holes one can also provide connection leads of various sizes and so the length, the winding and the branching of the real wiring circuit can be altered freely by the exchangeable insertion or the rearrangement of said connection leads. On the other hand, as the width of the frame 13 is equal to a half of one side of the square, it is possible to extend an electronic board effectively and set up a more complicated electronic circuit by jointing two electronic boards and mounting block units and connection leads on both boards.

What I claim is:

1. An electronic device for assembling various electronic circuits by the exchangeable insertion of block units and connection leads comprising block units encasing one of various circuits elements such as a resistor or a transistor and being provided with a plurality of electrically conductive and plane leg portions, conductive connection leads with same leg portions, and insulating boards with mounting holes bored at the central part of each side of imaginary squares drawn on said board and with a pair of tongue pieces attached to one side of each mounting hole which are spaced apart from each other at their bases more than at their tips and whose tips can open resiliently, the distance between the leg portions of each of said block units and said connection leads being at least equal to that between adjacent mounting holes and the area of said mounting hole being provided so that when at least two leg portions are inserted therein, they may be fastened by the resilient deformation of said leg portions thereby maintaining the electrical contact among leg portions.

2. An electronic device for assembling various electronic circuits by the exchangeable insertion of block units and connection leads comprising block units encasing one of various circuit units such as a resistor or a transistor and being provided with a plurality of conductive leg portions whose effective thickness can be changed by their elastic deformation, conductive connection leads with the same leg portions and insulating electronic boards with mounting holes bored at the central part of each side of imaginary squares drawn on said board, the distance between said leg portions of each of said block units and said connection leads being at least equal to the distance between adjacent mounting holes and the area of said mounting hole being provided so that when at least two leg portions are inserted therein, they may be fastened by the resilient deformation of said leg portions thereby maintaining the electrical contact among leg portions.

3. An electronic device according to the claim 1 in which the central part of said connection lead is bent so as to be apart from said electronic board when the connection lead is inserted in said mounting holes.

4. An electronic device according to the claim 1 in which said electronic board is provided with a frame at the peripheral region of the board and the distance between the edge of the board and the outermost mounting holes has a width equal to a half of said square.

* * * * *